May 13, 1952 W. P. FLETCHER 2,596,228
ARRANGING DEVICE FOR FLAT ARTICLES
Filed Feb. 13, 1948 4 Sheets-Sheet 1
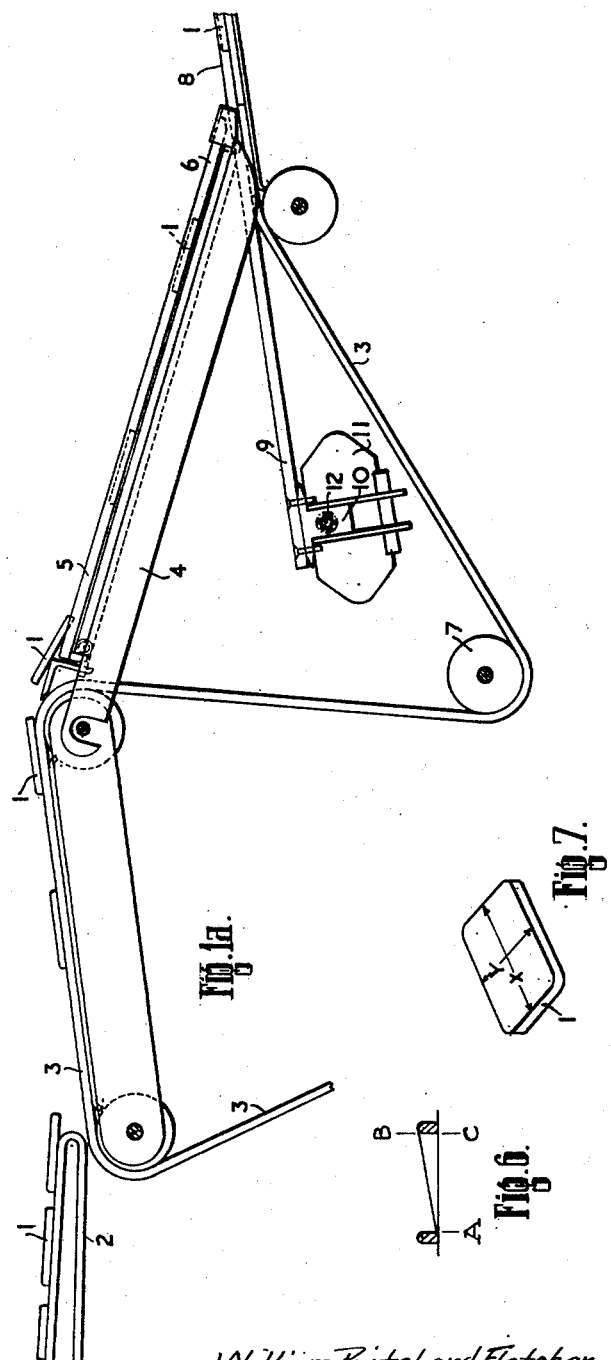
William Pritchard Fletcher, INVENTOR.
BY
J. Victor Armstrong, Atty

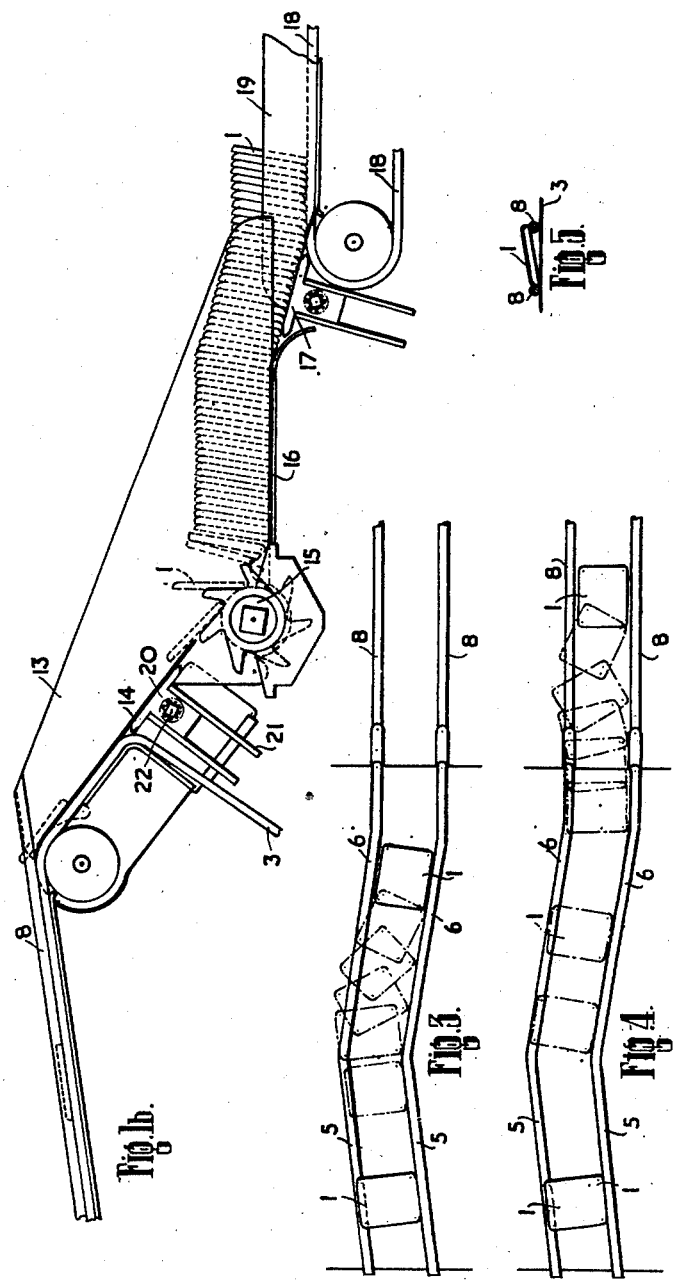

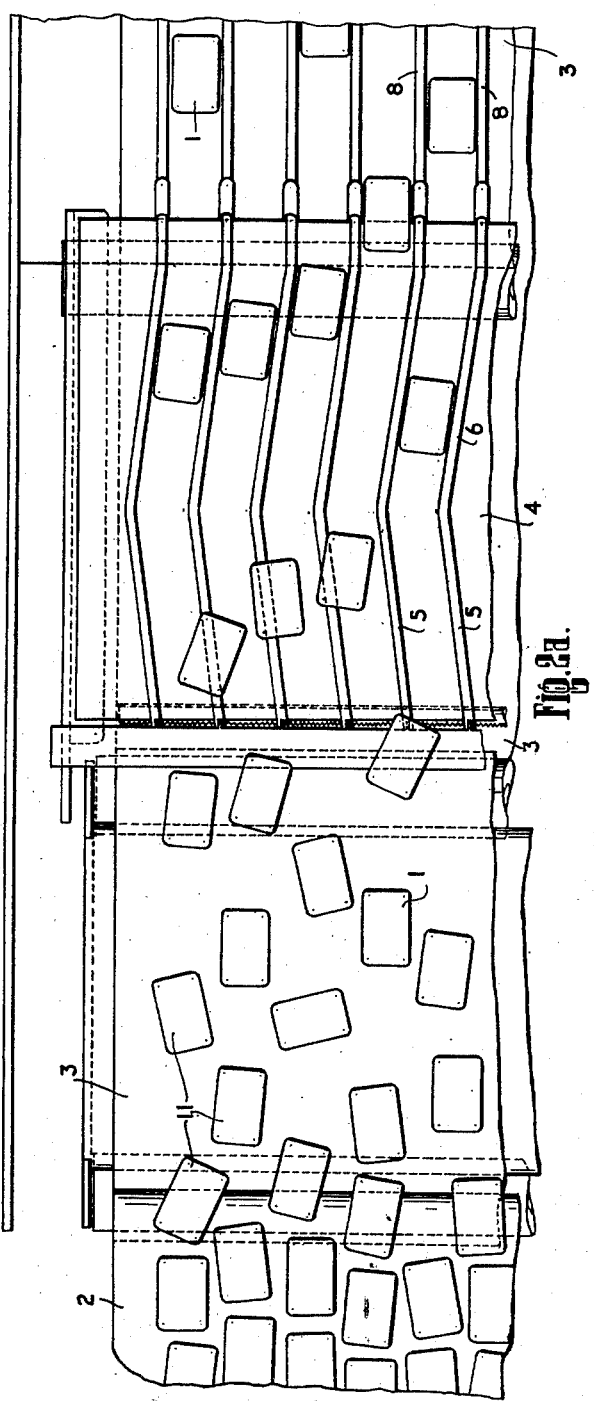

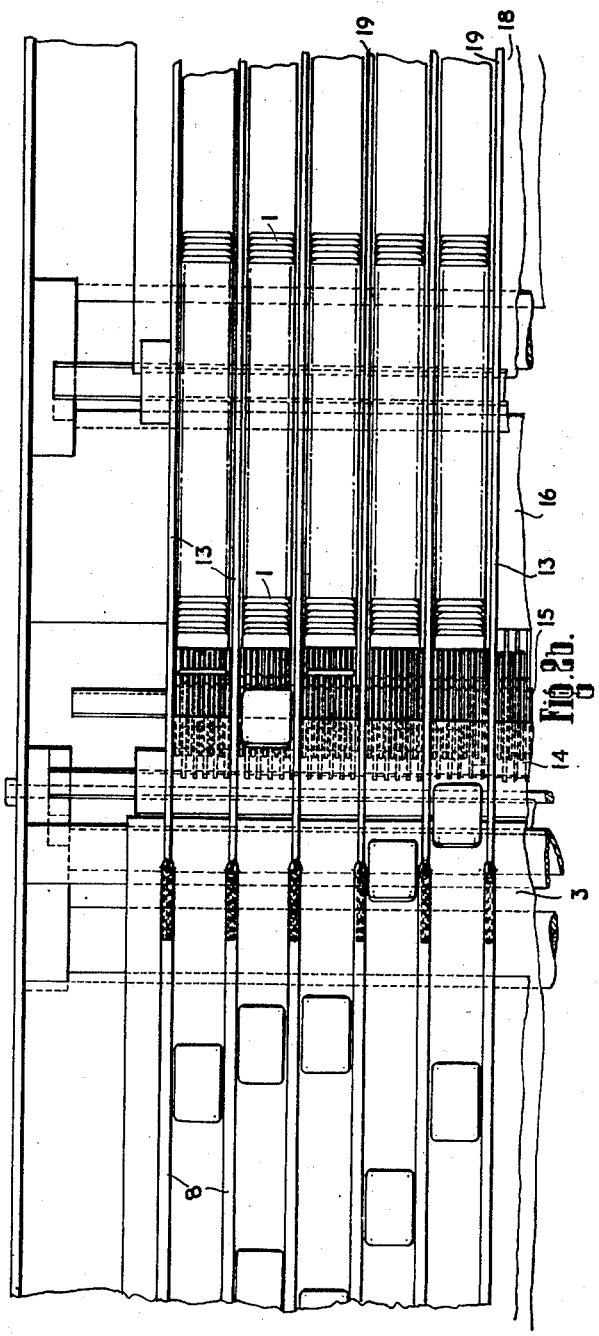

Patented May 13, 1952

2,596,228

UNITED STATES PATENT OFFICE 2,596,228

ARRANGING DEVICE FOR FLAT ARTICLES

William Pritchard Fletcher, Newton-le-Willows, England, assignor to T. & T. Vicars Limited, Newton-le-Willows, England, a British company Application February 13, 1948, Serial No. 8,194
In Great Britain February 24, 1947

2 Claims. (Cl. 198—30)

This invention relates to improvements in machines for accepting small articles such as biscuits from a moving conveyor on which they are lying and separating these articles into definite lines so that they may be delivered to a stacking device which will change their disposition from lying in a normal substantially horizontal plane to disposition in vertical planes, in which disposition they are carried in close formation, in which they can be easily picked up for packing purposes.

The biscuits or like substantially flat articles may be round, square, oval, rectangular, or almost any shape, and their exact disposition on the band may be irregular due to the previous transference from one conveyor web to the other, and it is an object of the invention to sort what may be an irregular stream of biscuits or other articles into lines between guides, and if the article has an uneven axis then to dispose it with its long axis in line with the direction of travel.

According to this invention the flat articles are allowed to slide down an inclined chute provided with upstanding ribs inclined first in one direction and then in the opposite direction and are then positively conveyed between spaced guide fins contiguous to the ends of the said ribs which are spaced apart slightly more than the minor dimension of the article whilst the hypotenuse from the base of one rib or fin to the top of an adjacent rib or fin is less than the major dimension of the article but greater than its minor dimension.

The invention is further described with reference to the accompanying drawings showing its application to the positioning of biscuits of oval or rectangular shape that is to say having a major or a minor dimension by way of example.

In the drawings,

Figure 1a is the left hand side of a sorting and positioning machine in diagrammatic side elevation, Figure 1b is the contiguous right hand side in similar view, Figure 2a is a plan view corresponding to Figure 1a, Figure 2b is a plan view corresponding to Figure 1b, Figure 3 is a diagrammatic plan view showing a possible disposition of articles on the device, Figure 4 is a diagrammatic plan view showing another possible disposition of articles on the device, Figure 5 is a diagrammatic end view showing a misplaced article on the device, Figure 6 is a diagram, and Figure 7 is a perspective view of a typical article dealt with by the device.

Articles 1 such as flat rectangular oblong biscuits are fed from a conveyor 2 which may be the continuous band conveyor of a baking oven to a moving conveyor belt 3 from which they pass on to the top end of an inclined chute or tray 4. This tray has attached to its upper surface a plurality of upstanding ribs 5, 6. These ribs have a part 5 lying at an angle to their contiguous parts 6. Where the article such as a biscuit (Figure 7) has a major dimension X and a minor dimension Y then the spacing and heighth of the ribs 5, 6 will be such that the spacing A—C (Figure 6) of the ribs is slightly greater than the dimension Y but the hypotenuse is less than the major dimension of the article that is to say less than X but greater than the minor dimension of the article that is to say greater than Y.

From the end of the inclined chute or tray 4 the articles are taken up by a conveyor which may be a separate conveyor but conveniently as shown is formed of a ram of the conveyor 3 which has been looped over guide roller 7. This conveyor run preferably extends upwardly at a slight angle to the horizontal and runs below a series of spaced guide fins 8 contiguous to the ends of the ribs 6 and similarly spaced thereto. Their height is preferably also such that the hypotenuse from the base of one fin 8 to the top of an adjacent fin 8 is less than the major dimension of the article but greater than its minor dimension.

The ends 6 of the ribs may embrace the fins 8 and these can be carried back as at 9 beneath the tray or inclined plane 4 to be mounted on a block 10 displaceable laterally in guides 11 by means of a screw and nut gear 12, for adjustment purposes.

The fins 8 are contiguous to vertical plates 13 lying over a chute 14 at the end of the conveyor run between which the biscuits can slide down into range of a rotating star wheel 15 which tilts each article in turn from a position inclined to the vertical on the chute 14, through the vertical, to a slight angle to the vertical on the opposite side of the said vertical, to its original inclination thereto. The biscuits or other articles are then pushed in juxtaposition along a plate 16 by the action of a star wheel and can be transferred by an adjustable guide plate 17 to a slow moving conveyor belt 18 also provided with spaced guide plates 19 above it, from which conveyor, groups of articles are readily removed for packing.

The chute 14 is preferably mounted on a block 20 displaceable in guides 21 by screw and nut means 22 for adjustment purposes.

Should now a biscuit or other like lamina article coming from conveyor 3 not happen to lie with its major dimension parallel to the upper part 5 of the guide ribs, as it slides down the tray or inclined chute 4 by gravity and reaches the dog-leg deviation 6 of the guide ribs it will be drawn into alignment as shown in Figure 3, but should it have continued to ride with one of its ends on a guide rib as shown in Figure 5, then the moving conveyor belt frictionally dragging on its opposite edge will draw it into alignment between the fins 8 as shown in Figure 4.

The shallow ribs and guides and their spacing prevent the articles jamming and are effective in sorting and disposing in predetermined position articles such as biscuits of unequal dimensions in length and breadth being particularly effective where the difference in such dimensions is not great.

I declare that what I claim is:

1. A positioning device for flat articles comprising an inclined chute, ribs on said inclined chute spaced apart at a distance slightly greater than the minor dimension of an article and of a height such that the hypotenuse from the base of one rib to the top of the next adjacent rib is less than the major dimension of the article but greater than its minor dimension, said ribs being inclined first in one direction and then in the other direction relatively to the surface of said inclined chute, means to feed articles to the upper end of said inclined chute, a moving belt conveyor and upstanding stationary fins adjacent to said conveyor similarly spaced to the said ribs and contiguous to their lower ends, and of a heighth such that the hypotenuse from the base of one fin to the top of the next adjacent fin is less than the major dimension of the article.

2. A positioning device for flat articles comprising an inclined chute, ribs on said inclined chute spaced apart at a distance slightly greater than the minor dimension of an article and of a height such that the hypotenuse from the base of one rib to the top of the next adjacent rib is less than the major dimension of the article but greater than its minor dimension, said ribs being inclined first in one direction and then in the other direction relatively to the surface of said inclined chute, means to feed articles to the upper end of said inclined chute, and a moving belt conveyor to take up articles from the lower end of said inclined plane.

WILLIAM PRITCHARD FLETCHER.

REFERENCES CITED

The following references are of record in the file of this patent:

UNITED STATES PATENTS

| Number | Name | Date |
| --- | --- | --- |
| 1,263,515 | Biehler | Apr. 23, 1918 |
| 1,352,607 | Jones | Sept. 14, 1920 |
| 1,501,285 | Lawrence | July 15, 1924 |
| 1,921,580 | Paterson | Aug. 8, 1933 |
| 1,972,489 | Rideout | Sept. 4, 1934 |
| 2,186,652 | Orth | Jan. 9, 1940 |
| 2,324,246 | Thompson | July 13, 1943 |
| 2,441,884 | Johnson | May 18, 1948 |

FOREIGN PATENTS

| Number | Country | Date |
| --- | --- | --- |
| 623,566 | Germany | Dec. 28, 1935 |